United States Patent [19]

Price

[11] Patent Number: 4,927,177
[45] Date of Patent: May 22, 1990

[54] CUSTOM MOLDED VEHICLE SPLASH GUARD

[75] Inventor: Robert A. Price, Glencoe, Ill.

[73] Assignee: G-P Manufacturing Co., Inc., Chicago, Ill.

[21] Appl. No.: 391,119

[22] Filed: Aug. 8, 1989

Related U.S. Application Data

[62] Division of Ser. No. 259,868, Oct. 19, 1988, Pat. No. 4,877,268.

[51] Int. Cl.⁵ .............................................. B62D 25/16
[52] U.S. Cl. ................................................... 280/851
[58] Field of Search ................ 280/851, 848, 849, 852

[56] References Cited

U.S. PATENT DOCUMENTS

| | | | |
|---|---|---|---|
| 4,099,736 | 7/1978 | Shiina | 280/851 |
| 4,315,634 | 2/1982 | Arenhold | 280/154.5 R |
| 4,678,198 | 7/1987 | Nomura | 280/849 |
| 4,709,938 | 12/1987 | Ward et al. | 280/154.5 R |

OTHER PUBLICATIONS

Powerflow, Inc., Sales Brochure, "Custom Fit Splashguards Countoured to Fit Your Vehicle", 1986 Form 10–8611, published by Powerflow, Inc., 2858 W. Market St., Akron, Ohio 44313.

Primary Examiner—Charles A. Marmor
Assistant Examiner—Michael Mar
Attorney, Agent, or Firm—Welsh & Katz, Ltd.

[57] ABSTRACT

A custom molded vehicle splash guard includes a display surface and generally codimensional mounting surface, the surfaces joined along common edge margins to form an open pocket therebetween. A clamshell type template package is provided with opposing recesses adapted to retain a pair of the splash guards of the invention in back-to-back fashion so that the recess may be removed from the package and serve as a template for accurately trimming the splash guard for mounting to a vehicle fender.

7 Claims, 2 Drawing Sheets

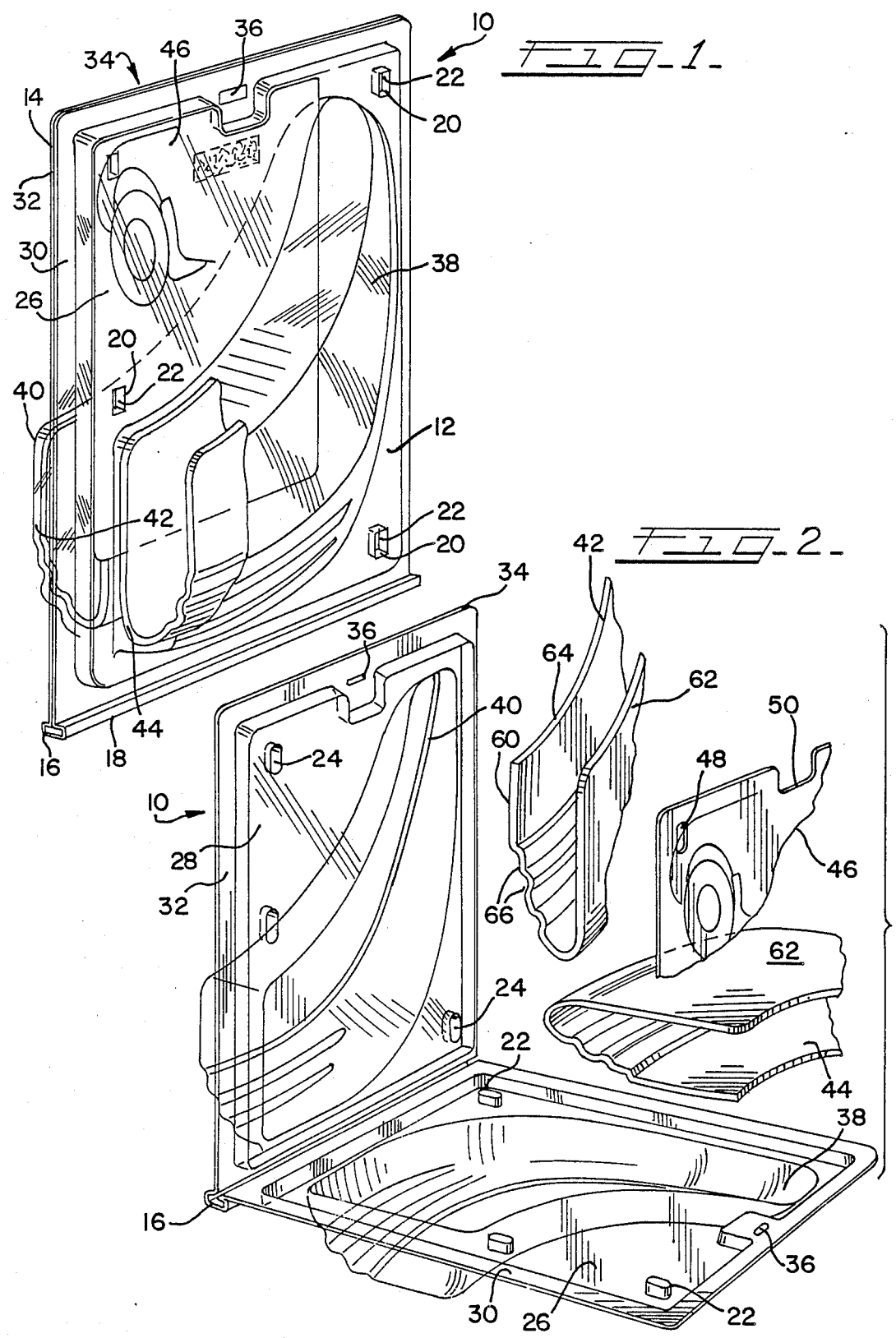

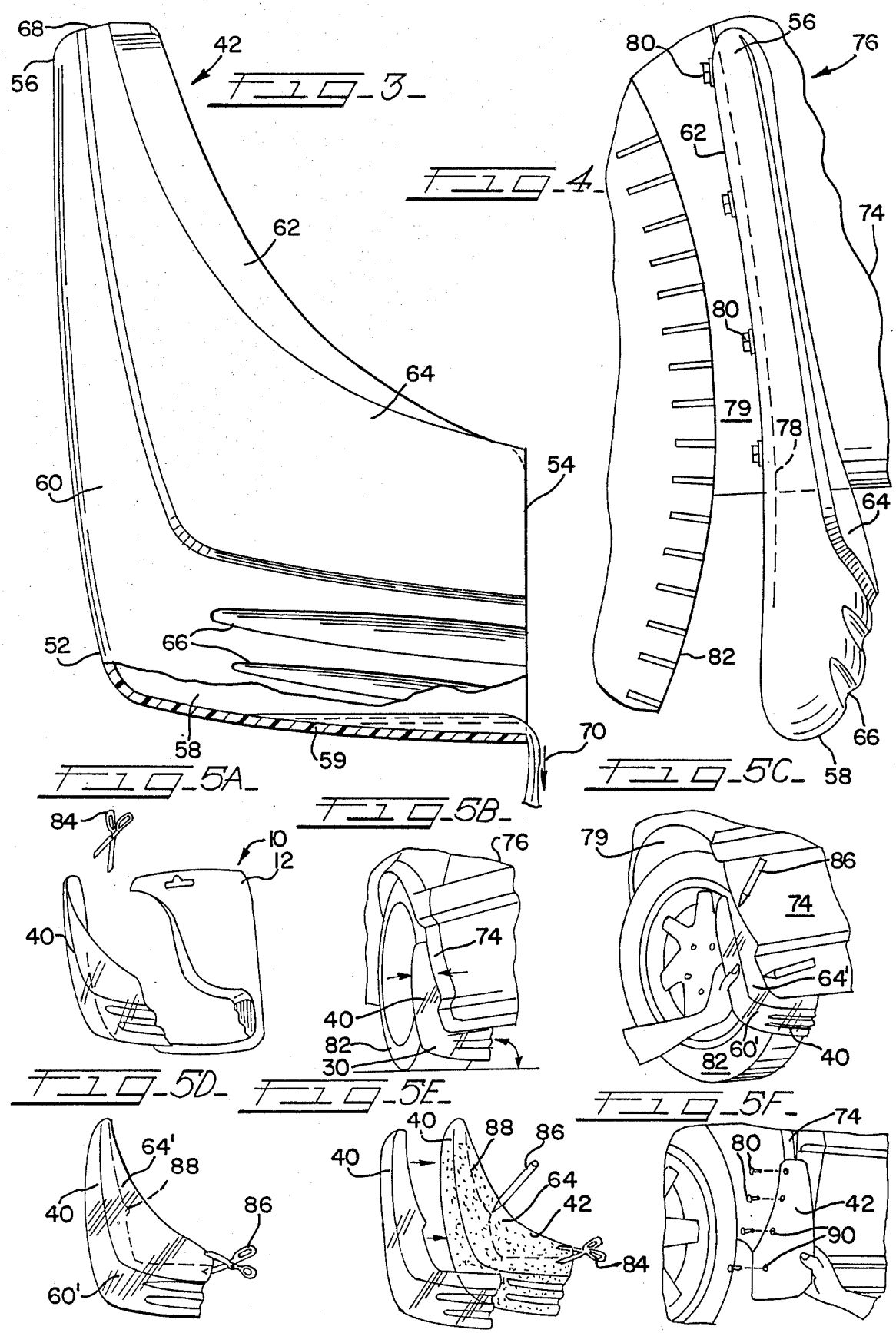

CUSTOM MOLDED VEHICLE SPLASH GUARD

Related Application

This is a division, of application Ser. No. 07/259,868, filed Oct. 19, 1988, now U.S. Pat. No. 4,877,268.

BACKGROUND OF THE INVENTION

The present invention relates generally to splash guards adapted for mounting to vehicle fenders for protection against water borne road dirt and salt, and specifically to a custom molded splash guard provided in a template package to facilitate mounting of the guard to a variety of fender configurations.

Conventional vehicle splash guards are generally planar and include a broad lower portion and a relatively narrower upper portion adapted to be secured to the outer edge of the vehicle fender behind the wheel. A plurality of spaced screws or clip fasteners are used to mount the guard to the inner lip of the fender. The correct positioning of the splash guard upon the fender is important for functional as well as aesthetic reasons.

Recent trends in automotive styling have resulted in the introduction of custom molded splash guards, which are normally provided with three dimensional formations designed to integrate the lines of the splash guard with the lines of the fender or other trim, such as plastic rocker panel molding. Custom molded splash guards also are designed to provide the vehicle with a more substantial, "sporty" appearance, especially when used in conjunction with other molded accessories such as air dams and/or spoilers.

These formations add significant value to custom molded splash guards, enabling them to be sold at premium prices. Thus, greater accuracy is required in mounting custom molded splash guards, both for aesthetic reasons, as well as to avoid damage or destruction of the costlier guard through improper mounting. Further, improperly mounted splash guards may retain water against the vehicle fender, causing corrosion.

In an attempt to facilitate accurate mounting, conventional custom molded splash guards are provided in a range of size and shape formats to enable proper mounting on a wide variety of vehicle fender configurations. However, in many cases, provided the user has selected the proper format for his vehicle, additional trimming by the user is still required for accurate mounting.

Thus, there is a need for a custom molded splash guard which provides an attractive appearance to the vehicle, and which, when supplied in a single format, may be readily adapted for accurate mounting on a wide variety of vehicle fender configurations.

SUMMARY OF THE INVENTION

Accordingly, a custom molded vehicle splash guard is provided having a display surface and a substantially codimensional mounting surface joined along common outer and lower edges in spaced parallel relation to each other to form a pocket therebetween. The display surface is provided with a substantially planar portion designed to facilitate trimming for accurate location of the guard upon a variety of vehicle fender configurations. The mounting surface is slightly larger than the display surface so as to be easily mounted to conventional fenders, or to plastic fender liners. If desired, the mounting surface may be concave to generally follow the curve of the vehicle tire. The lower edge of the guard may be canted downwardly toward an open edge of the pocket for drainage purposes.

To facilitate accurate mounting, a template splash guard package is provided in the form of a clamshell blister adapted to retain a pair of custom molded splash guards. Each clamshell half is dimensioned to conform to the configuration of a respective left or right splash guard, including the display surface. Each blister package half thus provides a template of the respective guard which may be used to accurately trim the actual splash guard to follow the curve of the vehicle fender.

BRIEF DESCRIPTION OF THE DRAWINGS

FIG. 1 is a front perspective elevational view of a pair of the custom molded vehicle splash guards of the invention enclosed in a template package of the invention with parts shown broken away for clarity;

FIG. 2 is an exploded perspective elevational view of the template package and the splash guards depicted in FIG. 1;

FIG. 3 is a front elevational view of the vehicle splash guard of the invention with portions cut away for clarity;

FIG. 4 is a side elevational view of the splash guard of the invention shown mounted on a vehicle; and FIGS. 5A-5F are a diagrammatic chronological representation of the process of mounting the splash guard of the invention to a vehicle using the template package.

DESCRIPTION OF THE PREFERRED EMBODIMENT

Referring now to the drawings, FIG. 1 depicts a template package of the invention generally designated 10. The package 10 is preferably of the type known in the industry as a clamshell blister having a front panel 12 and a rear panel 14, the panels being approximate mirror images of each other and integrally joined by a hinge 16 along a lower edge 18 of the package 10. The front and rear panels 12 and 14 may be secured together in registry with each other by a plurality of buttons 20. Each button 20 includes a projecting lug formation 20 in the front panel 12 which is matingly received by a recess 24 in the rear panel 14 (recessed portion 24 best seen in FIG. 2). In addition, the front panel 12 includes a recessed center portion 26 which is adapted to matingly accommodate a center boss portion 28 of the rear panel 14 (best seen in FIG. 2).

If desired the front and rear panels 12 and 14 of the package 10 may be sealed to each other along a pair of peripheral lips 30 and 32. At an upper end 34 of the package 10, a hanger opening 36 is centrally located and passes through both the front panel 12 and the rear panel 14. The front and rear panels 12 and 14 are each provided with a splash guard cavity 38 and 40 respectively, the cavities 38, 40 being oriented so as to be in back-to-back fashion to each other.

When the package 10 is assembled, each cavity 38 and 40 is provided with corresponding left and right custom molded splash guards designated 42 and 44 respectively, referring to the side of the vehicle to which the splash guards are attached. The package 10 is completed by the insertion of an information card 46 between the front and rear panels. The card 46 may be provided with at least one button opening 48 and/or other cut out portions 50 adapted to maintain the position of the card 46 within the package 10 once it is closed.

Referring now to FIG. 3, the left side splash guard 42 is shown in greater detail and is discussed herein; however, the right side splash guard 44 is identical thereto, being a mirror image thereof. The splash guard 42 includes an outer side edge 52, an inner side edge 54, a narrowed upper portion 56 and a relatively broader lower portion 58 having a bottom edge 59. In addition, the splash guard 42 includes a display surface 60 and a mounting surface 62. The display surface 60 includes a generally planar portion 64 and may be provided with a series of flutes or other designs 66 as desired.

In the preferred embodiment, the display surface 60 and the mounting surface 62 are joined together along the common outer edge 52, the lower edge 59 and a portion 68 of the upper end 56 to form a pocket. The formation of the pocket provides the edges 52, 58 and the portion 68 with a generally rounded configuration. The bottom edge 59 is generally canted downwardly toward the inner side edge 54 so that any water trapped within the pocket is allowed to drain out the inner side edge 54 in the direction indicated by the arrow 70. This is to avoid corrosion caused by dirt or salt-laden water being retained in close proximity to the vehicle. The mounting surface 62 is generally broader at the upper portion 56 than is the display surface 60 to provide the user with a greater area for mounting the splash guard 42 to a vehicle. The splash guard 42 is preferably made of a blend of plastic and rubber, but may also be made solely of rubber or of a variety of flexible or rigid plastic materials as are commonly used in this industry.

Referring now to FIG. 4, the splash guard 42 is shown mounted to a fender 74 of a vehicle 76 such as a car, van or truck. It will be seen that the planar portion 64 of the display surface 60 has been trimmed to conform to the contour of the fender 74. Furthermore, the mounting surface 62 has been situated so to be directly opposite the forward edge 78 of a wheel well 79 in the fender 74, and is held thereagainst by a plurality of threaded fasteners 80. In the preferred embodiment, the mounting surface 62 is provided with a gently sloping or curved configuration designed to roughly track the outer circumference of a tire 82 of the vehicle 76.

When trimmed properly, the splash guard 42, 44 of the invention provides an attractive and functional addition to the appearance of the vehicle 76. However, if the splash guard is not properly trimmed to conform to the shape of the fender 74, the splash guard may not fit properly, or may be so disfigured as to require disposal by the user. In order to alleviate the problem of improper trimming of splash guards, and to facilitate the mounting thereof to vehicle fenders of various shapes, and specifically referring to FIGS. 5A–5F, the template the invention may be used to provide an accurate representation of the splash guard and thus facilitate the trimming and mounting operation.

Although in FIGS. 5A–5F the trimming and mounting of the left side splash guard 42 is shown, it will be appreciated that the right side splash guard 44 will be trimmed and mounted in similar fashion. Referring first to FIG. 5A, once the user has purchased the package 10, the splash guards 42, 44 are removed and the splash guard cavities 38 and 40 are separated therefrom as by cutting with a scissors 84 or knife. Preferring next to FIG. 5B, once the cavity 40 has been detached from the rear panel 14 it is then placed against the fender 74 in the manner in which it would appear as finally mounted.

Since the cavity 40 is a substantially similar, if not exact representation of the display surface 60, in the following description of the mounting procedure, portions of the cavity corresponding to portions of the splash guard 42 will be designated with an apostrophe (i.e., 60'). In order to properly conform the display surface 6' to the fender shape, and referring now to FIG. 5C, the shape of the fender 74 is marked or scored upon the planar portion 64' with an appropriate marking device 86.

Referring now to FIG. 5D, a scissors 84 or other cutting device may be used to cut the planar portion 64' along a scored line 88 inscribed by the marking device 86. The trimmed cavity 40 as shown in FIG. 5E is then superimposed upon the untrimmed splash guard 42 and the scored line 88 is then traced upon the planar portion 64 of the splash guard 42. The splash guard 42 is then trimmed by cutting along the traced line on the guard corresponding to the scored line 88. Alternatively, the cavity 40 may be held upon the splash guard, which is then trimmed along the scored line 88 of the cavity 40.

Once steps 5A–5E have been completed, an accurately trimmed splash guard 42 is ready for mounting upon the vehicle 76. Referring now to FIG. 5F, the trimmed splash guard 42 is placed against the vehicle so that the trimmed planar portion 64 is in contact with the outer surface of the fender 74 (best seen in FIG. 4). The mounting surface 62 is not trimmed in the mounting process, but instead, suitable holes 90 are drilled therein by the user. The broader surface area provided to the mounting surface 62 is adapted so that the user may attach the mounting surface either to an outer rim of the fender wheel well 79 or to inner plastic fender liners (not shown) provided in many late model automobiles. A plurality of threaded fasteners 80 are used to secure the splash guard 42 to the vehicle 76 through the holes 90.

Thus, it will be seen that the custom molded splash guard of the invention is both attractive and functional, and when using the template package as a mounting aid as disclosed herein, may be mounted on the vehicle in accurate fashion to avoid product waste and unattractive vehicle appearance.

While a particular embodiment of the custom molded vehicle splash guard and template package therefor of the invention has been shown and described, it will be appreciated by those skilled in the art that changes and modifications may be made thereto without departing from the invention in its broader aspects and as set forth in the following claims.

I claim:

1. A custom molded vehicle splash guard for attachment to a lower portion of a vehicle fender adjacent a corresponding wheel well so as to intercept debris thrown rearwardly by a corresponding vehicle tire to prevent the debris from impacting the fender portion comprising:

a display surface having an inner edge, an outer edge, an upper portion, a substantially planar portion and a lower edge;

a slightly concave mounting surface having an inner edge, an outer edge, an upper portion and a lower edge; and a central portion extending between and connecting said mounting surface and said display surface along said outer and lower edges thereof, forming a U-shaped pocket open along said inner edges, with said display surface and said mounting surface being in generally parallel relation to each other;

wherein said display surface is configured to be trimmed to generally correspond with the outer profile of the vehicle fender portion, and said mounting surface is configured to be secured to a wall of the wheel well adjacent the fender portion, and, upon mounting, the inside edge of said display surface being in engagement with the fender portion.

2. The splash guard as defined in claim 1 wherein said bottom edges of said display surface and said mounting surface are canted downwardly toward said respective inner edges.

3. The splash guard as defined in claim 1 wherein said mounting surface is provided with an upper portion which is larger than a corresponding upper portion of said display surface.

4. The splash guard as defined in claim 1 wherein said mounting surface is slightly concave.

5. The splash guard as defined in claim 1 wherein said display surface includes a substantially planar portion.

6. The splash guard as defined in claim 1 wherein said guard is fabricated from a blend of plastic and rubber.

7. The splash guard as defined in claim 1 wherein said joined edges are generally rounded.

* * * * *

UNITED STATES PATENT AND TRADEMARK OFFICE
CERTIFICATE OF CORRECTION

PATENT NO. : 4,927,177

DATED : May 22, 1990

INVENTOR(S) : Robert A. Price

It is certified that error appears in the above-identified patent and that said Letters Patent is hereby corrected as shown below:

Column 1, line 6, after "4,877,268." insert the following --The present application is related to co-pending Design Patent Application Serial No. 07/259,696, filed October 19, 1988 entitled "Custom Molded Vehicle Splash Guard".--

Column 3, line 52, after "template" insert --package 10 of--; and

Column 4, line 5, delete "6'" and insert --60'--.

Signed and Sealed this

Seventeenth Day of September, 1991

Attest:

HARRY F. MANBECK, JR.

Attesting Officer

Commissioner of Patents and Trademarks